(12) United States Patent
Qureshi et al.

(10) Patent No.: US 7,305,508 B2
(45) Date of Patent: Dec. 4, 2007

(54) SEMAPHORING SYSTEM BETWEEN SYSTEM FIRMWARE AND HARDWARE MANIPULATION SUBSYSTEM

(75) Inventors: Shiraz Ali Qureshi, Rocklin, CA (US); Dong Wei, Granite Bay, CA (US); Terry Lee, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 10/692,038

(22) Filed: Oct. 22, 2003

(65) Prior Publication Data

US 2005/0091416 A1    Apr. 28, 2005

(51) Int. Cl.
  *G06F 12/00*  (2006.01)
  *G06F 12/14*  (2006.01)
(52) U.S. Cl. .................................... 710/200
(58) Field of Classification Search ................ 710/200, 710/260; 700/200
  See application file for complete search history.

(56) References Cited

U.S. PATENT DOCUMENTS

| | | | | |
|---|---|---|---|---|
| 5,615,167 A * | 3/1997 | Jain et al. | ............... | 365/230.08 |
| 5,886,992 A * | 3/1999 | Raatikainen et al. | ....... | 370/410 |
| 6,131,131 A * | 10/2000 | Bassman et al. | ............ | 710/15 |
| 6,373,721 B2 * | 4/2002 | Lecinski et al. | ............ | 361/826 |
| 6,584,573 B1 * | 6/2003 | Wunderlich et al. | ........ | 713/322 |
| 6,779,090 B2 * | 8/2004 | McKenney et al. | ......... | 711/152 |
| 6,795,850 B2 * | 9/2004 | Wu et al. | .................... | 709/213 |
| 6,912,621 B2 * | 6/2005 | Harris | ........................ | 711/112 |
| 6,976,155 B2 * | 12/2005 | Drysdale et al. | ............ | 712/225 |
| 2002/0133487 A1 * | 9/2002 | Oshins et al. | .................. | 707/5 |
| 2003/0041273 A1 * | 2/2003 | Wang | ......................... | 713/300 |
| 2003/0065853 A1 * | 4/2003 | Lary et al. | ................... | 710/260 |

OTHER PUBLICATIONS

A Simpler Solution: Peterson's Algorithm, Webpages [online] [retrieved on Oct. 21, 2003]. Retrieved from from the internet: http://www/csee/wvu.edu/jdm/classes/cs356/notes/mutex/Peterson.html Total pp. 2.
"IA-64 System Abstraction Layer Specification", Intel, Jan. 2000, Order No. 245359-001. Webpages [online] [retreived on Oct. 21, 2003]. Retrieved from the internet: http://www.csee.umbc.edu/help/architecture/24535901.pdf. Total pp. 112.

* cited by examiner

*Primary Examiner*—Rehana Perveen
*Assistant Examiner*—Mohammed H Rehman (57) ABSTRACT

In one embodiment of the invention, a method of semaphoring between a system firmware and ACPI subsystem, includes: prior to entering a critical section by a first entity, checking a turn flag to determine if a second entity has a turn to access a critical section; if the second entity has the turn, then checking an In flag of the second entity to determine if the second entity is in the critical section; if the second entity is in the critical section, then waiting for the second entity to exit the critical section; and entering the critical section by the first entity. The method may further include: if the second entity is not in the critical section, then entering the critical section by the first entity.

19 Claims, 3 Drawing Sheets

SEMAPHORING SYSTEM BETWEEN SYSTEM FIRMWARE AND HARDWARE MANIPULATION SUBSYSTEM

TECHNICAL FIELD

Embodiments of the present invention relate generally to semaphoring systems. More particularly, embodiments of the present invention relate to a semaphoring system between a system firmware and hardware manipulation subsystem (e.g., ACPI subsystem).

BACKGROUND

In the past, platform designs have issues with the interaction between the ACPI (Advanced Configuration and Power Interface) and system firmware when they share a hardware resource. The ACPI specification always requests for full control of the ACPI hardware resources or any hardware that may be involved with the ACPI methods. There are exceptions to the above process where it is imperative for the system firmware to take control of hardware resources while ACPI is interacting with a resource.

There is no currently available industry-wide method or standard to solve the issue where SAL (system abstraction layer) and ACPI have to share a hardware resource, mutually and exclusively.

Therefore, the current technology is limited in its capabilities and suffers from at least the above constraints and deficiencies.

SUMMARY OF EMBODIMENTS OF THE INVENTION

In one embodiment of the invention, a method of semaphoring between a system firmware and ACPI subsystem, includes: prior to entering a critical section by a first entity, checking a turn flag to determine if a second entity has a turn to access a critical section; if the second entity has the turn, then checking an In flag of the second entity to determine if the second entity is in the critical section; if the second entity is in the critical section, then waiting for the second entity to exit the critical section; and entering the critical section by the first entity. The method may further include the step of: if the second entity is not in the critical section, then entering the critical section by the first entity.

The first entity may be the system firmware and the second entity may be the ACPI subsystem. Alternatively, the first entity may be the ACPI subsystem and the second entity may be the system firmware.

In another embodiment, an apparatus for semaphoring between a system firmware and ACPI subsystem, includes: a first entity; a second entity; a semaphoring system between the first entity and second entity, wherein the first entity is configured to check a turn flag to determine if the first entity or the second entity has a turn to access a critical section; wherein the first entity is configured to check an In flag of the second entity to determine if the second entity is in the critical section, if the second entity has the turn, then checking an In flag; wherein the first entity is configured to wait for the second entity to exit the critical section, if the second entity is in the critical section, and enter the critical section after exit by the second entity.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
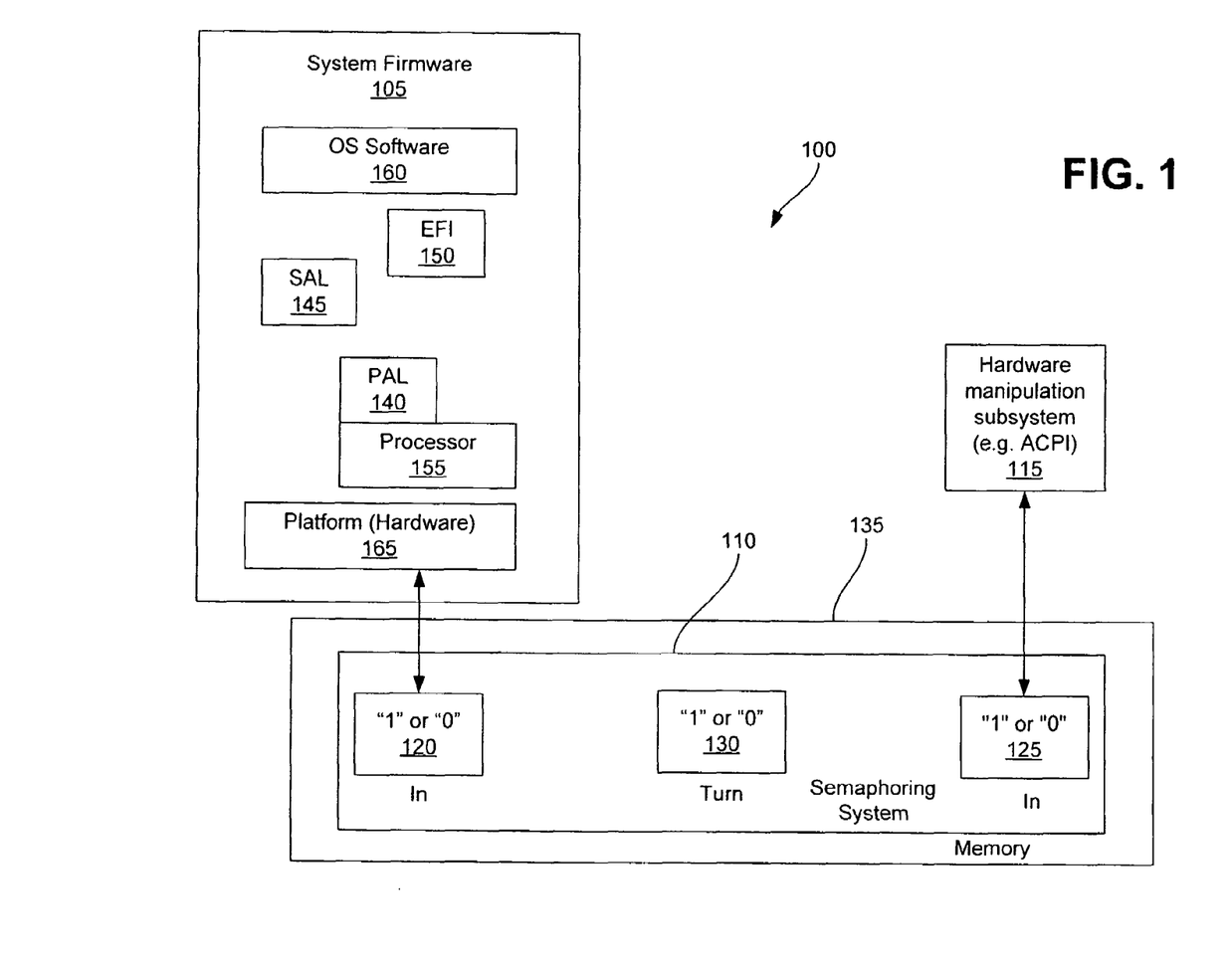
FIG. 1 is a block diagram of an apparatus (system) in accordance with an embodiment of the invention.

FIG. 1 is a block diagram of a system (or apparatus) 100 in accordance with an embodiment of the invention. The system 100 is typically implemented in a computing device, such as, for example, a computer, notebook, server, or other suitable computing devices. In one embodiment, the system 100 includes a system firmware 105, semaphoring system 110, and ACPI (advance configuration and power interface) sub-system 115. It is noted that the ACPI sub-system 115 may broadly represent other suitable types of hardware manipulation subsystems.

The semaphoring system 110 can solve contention problem for hardware resources in a computer. The semaphoring system 110 employs a software algorithm that provides mutual exclusions on critical sections. As discussed below, the software algorithm may be based upon, for example, Peterson's algorithm for purposes of solving the contention problems between the system firmware 105 and ACPI sub-system 115. As an example, SAL (system abstraction layer in system firmware 105) and ACPI sub-system 115 may be required to share a resource, mutually and exclusively. The semaphoring system 110 advantageously provides the mutual exclusion on critical sections.

An advantage of the software algorithm employed by the semaphoring system 110 is that there is no requirement for any operating system (OS) changes due to the software solution provided by an embodiment of the invention. Additionally, another advantage of the software algorithm employed by the semaphoring system 110 is to provide a stable platform (i.e., the software algorithm can be employed across different types of platforms and across systems based upon the IA-64 architecture, since "backdoor" hooks are not utilized).

Shared resource management is a fundamental challenge of multitasking. A task (or thread, or process or entity) needs the ability to execute sequences of instructions without interference so that the task can atomically manipulate shared data. These sequences of instructions, known as "critical sections", are bracketed by entry and exit protocols that satisfy four properties—mutual exclusion, absence of deadlock, absence of unnecessary delay, and eventual entry (no starvation).

Relative to a shared resource, mutual exclusion requires that only one task at a time execute in a critical section. Critical section entry and exit protocols typically use mechanisms such as polled flags (often called simple locks or spin locks) or more abstract entities such as blocking semaphores.

Simple locks can be used to build protection mechanisms of greater complexity.

In programming, especially in UNIX systems, semaphores are a technique for coordinating or synchronizing activities in which multiple tasks (or processes or entities) compete for the same resources. Semaphores are commonly used for two purposes: to share a common memory space and to share access to files. Conventionally, a semaphore is a value in a designated place in operating system (or kernel) storage that each task can check and then change. Depending on the value that is found, the task can use the resource or will find that the resource is already in use and must wait for some period before trying again to use the resource. Semaphores can be binary (0 or 1) or can have additional values. Typically, a task (which is using semaphores) checks the value and then, if the task is using the resource, changes the value to reflect its use so that subsequent semaphore users (i.e., another task or entity) will know to wait before using the resource.

In an embodiment of the invention, the semaphoring system 110 can be implemented by placing the data structure of the semaphoring system 110 in a shared memory 135. The shared memory 135 can be, for example, a memory location, scratch Random Access Memory (RAM), or non-volatile memory.

As discussed below, the semaphoring system 110 permits mutual exclusion on critical sections, where a priority between the system firmware 105 and ACPI subsystem 115 is determined based upon the values of "In" flag, "In" flag 125, and "turn" flag 130. The system firmware 105 sets the value of In flag 120, while ACPI 115 sets the value of In flag 125. The flags 120, 125, and 130 are typically data structures stored in the shared memory 135.

As an example, if the Turn flag 130 has a particular value (e.g., "1") then the system firmware 105 has the turn to access its critical sections. Of course, the system 100 may be programmed such that the ACPI subsystem 115 may instead have the turn to access its critical sections if the Turn flag 130 has a value of "1".

As an example, if the In flag 120 has a value of "1" (or "TRUE"), then the system firmware 105 is in its critical section. If the In flag 120 has a value of "0" (or "FALSE"), then the system firmware 105 is not in its critical section.

As an example, if the In flag 125 has a value of "1" (or "TRUE"), then the ACPI subsystem 115 is in its critical section. If the In flag 125 has a value of "0" (or "FALSE"), then the ACPI subsystem 115 is not in its critical section.

For purposes of describing example operations of the system 100, the above-described convention of flag values will be used.

The system firmware 105 sets up the hardware configuration in the computer. As known to those skilled in the art, firmware is programming that is inserted into programmable read-only memory (programmable ROM), thus becoming a permanent part of a computing device. Firmware is often responsible for the behavior of a system when the system is first switched on. Firmware is created and tested like software (by using microcode simulation). When ready, firmware can be distributed like other software and, using a special user interface, installed in the programmable read-only memory by the user.

The IA-64 firmware includes three major required components: processor abstraction layer (PAL) 140, system abstraction layer (SAL) 145, and extended firmware interface layer (EFI) 150. PAL 140 encapsulates the processor model specific hardware 155 and is part of the IA-64 Instruction Set Architecture (ISA) extension. PAL 140 is the firmware layer that abstracts the processor implementation-specific features and is independent of the number of processors. SAL 145 is the platform specific firmware component that isolates the operating system (OS) 160 and other higher level software from implementation differences in the platform 165. PAL 140, SAL 145, and EFI 150 together provide system initialization and boot, Machine Check Abort (MCA) handling, Platform Management Interrupt (PMI) handling, and other processor and system functions which may vary between implementation.

The ACPI sub-system 115 is a specification that defines the interfaces to be used by the OS 160 to obtain data or to manipulate hardware in the computer. Specifically, ACPI is a power management specification that enables the operating system 160 to control the amount of power given to each device attached to the computer. With ACPI, the operating system 160 can turn off peripheral devices, such as a CD-ROM players, when the peripheral device is not in use.

In one embodiment, the semaphoring system 110 implements Peterson's algorithm between the system firmware 105 and ACPI subsystem 115 in order to provide mutual exclusion on critical sections and solve contention problems. Peterson's algorithm is discussed, for example, in the following link in which the contents are hereby fully incorporated herein by reference:

<http://www.csee.wvu.edu/~jdm/classes/cs356/notes/mutex/Peterson.html>.

Table 1 is an example pseudocode that describes Peterson's algorithm.

TABLE 1

```
INITIALIZATION:
    typedef char boolean;
    ...
    shared boolean flags [n -1];
    shared int turn;
    ...
    turn = i ;
    ...
    flags [i ] = FREE;
    ...
    flags [j ] = FREE;
    ...
ENTRY PROTOCOL ( for Process i ):
    /* claim the resource */
    flags [i ] = BUSY;
    /* give away the turn */
    turn = j ;
    /* wait while the other process is using the
resource *and* has
    the turn */
    while ( (flags [j] = = BUSY) && (turn != i ) )
{
}
EXIT PROTOCOL ( for Process i ) :
    /* release the resource */
    flags [i ] = FREE
```

Peterson's algorithm is suitable for embodiments of the invention because of a relatively small amount of coding required for the semaphoring system 110 to interact with ACPI. However, it is within the scope of embodiments of the invention to use other software algorithms that allow two entities to access and manipulate a shared data structure for purposes of determining priorities between the two entities.

The system firmware 105 and the ACPI sub-system 115 decide on a location of the semaphore (including the flags 120, 125, and 130). In the example of FIG. 1, the semaphore is placed in the shared memory 135. The shared memory 135 may be, for example, non-volatile memory, system RAM (random access memory), or scratch RAM. The choice of the semaphore location may be made into a run-time decision by using a hand-off between the system firmware 105 and the ACPI sub-system 115 at boot-time. The decided semaphore location in the memory 135 can be accessed in ACPI using an "operation region" which is a construct used by the ACPI to access (read and/or write) an address associated region.

Note that it is not a constraint to place all three flags 120, 125, and 130 in the same shared memory 135. Thus, other embodiments of the invention may permit the flags 120, 125, and 130 to be placed in separate memory locations.

If the ACPI sub-system 115 provides atomicity in read and write operations to the operation regions and also preserve the order of the read and write operations, then the semaphoring system 110 can implement Peterson's algorithm to assure mutual exclusion. The order of the read and write operations for the flag values is a fundamental requirement of Peterson's algorithm. Therefore, an embodiment of the invention provides a process that will insure that the system firmware 105 and ACPI sub-system 115 will not enter into each other's critical sections and will not place the platform in an indeterminate state, which could potentially lead to an overall system crash.

The following method describes the steps when the system firmware 105 needs to access and manipulate its critical section. The system firmware 105 will first check the value of the turn flag 130 in order to determine if the system firmware 105 or the ACPI subsystem 115 has the turn to access the critical sections. As an example, if the turn flag 130 has a value of "0", then the ACPI subsystem 115 has the turn to access the critical sections; on the other hand, if the turn flag 130 has a value of "1", then the system firmware 105 has the turn to access the critical sections. In accordance with Peterson's algorithm, the entity that is checking the turn flag 130 (system firmware 105 in this particular example) will write to the turn flag 130 and attempt to give the turn to the other entity (ACPI subsystem 115 is the other entity in this particular example).

If the turn flag 130 indicates that the ACPI subsystem 115 has the turn to access the critical sections (i.e., the turn flag 130 has a value of "1"), then the system firmware 105 will check the In flag 125 to determine if the ACPI subsystem 115 is in the critical sections. As an example, the In flag 125 has a value of "1" to indicate that the ACPI subsystem 115 is in the critical sections and has a value of "0" to indicate that the ACPI subsystem 115 is not in the critical sections. Similarly, as an example, the In flag 120 has a value of "1" to indicate that the system firmware 105 is in the critical sections and has a value of "0" to indicate that the system firmware 105 is not in the critical sections.

If the ACPI subsystem 115 is in the critical sections, then it had previously set the In flag 125 to a value of "1", and the system firmware 105 will wait and will not access the critical sections until after the ACPI subsystem 115 sets the In flag 125 to a value of "0" to indicate that the ACPI subsystem 115 is no longer in the critical sections. After the In flag 125 changes to a value of "0" to indicate that the ACPI subsystem 115 is no longer in the critical sections, then the system firmware 105 will access the critical section and set the In flag 120 to a value of "1" to indicate that the system firmware 105 is in the critical sections. After the system firmware 105 is no longer in the critical sections, the system firmware 105 will set the In flag 120 to a value of "0".

As discussed above, when the system firmware 105 needs to access and manipulate its critical section, the system firmware 105 will first check the value of the turn flag 130 in order to determine if the system firmware 105 or the ACPI subsystem 115 has the turn to access the critical sections. If the turn flag 130 indicates that the system firmware 105 has the turn to access the critical sections (i.e., the turn flag 130 has a value of "0" in the above example), then the system firmware 105 write to the turn flag 130 to attempt to give the turn to the ACPI subsystem 115 to access the critical sections.

After the system firmware 105 has taken its turn to access the critical sections and is no longer in the critical sections, the system firmware 105 will set the In flag 120 to a value of "0".

The following method describes the steps when the ACPI subsystem 115 needs to access and manipulate its critical section. The ACPI subsystem 115 will first check the value of the turn flag 130 in order to determine if the system firmware 105 or the ACPI subsystem 115 has the turn to access the critical sections.

If the turn flag 130 indicates that the system firmware 105 has the turn to access the critical sections (i.e., the turn flag 130 has a value of "0"), then the ACPI subsystem 115 will check the In flag 120 to determine if the system firmware 105 is in the critical sections. As an example, the In flag 120 has a value of "1" to indicate that the system firmware 105 is in the critical sections and has a value of "0" to indicate that the system firmware 105 is not in the critical sections.

If the system firmware 105 is in the critical sections, then it had previously set the In flag 120 to a value of "1", and the ACPI subsystem 115 will wait and will not access the critical sections until after the system firmware 105 sets the In flag 120 to a value of "0" to indicate that the system firmware 105 is no longer in the critical sections. After the In flag 120 changes to a value of "0" to indicate that the system firmware 105 is no longer in the critical sections, then the ACPI subsystem 115 will access the critical section and set the In flag 125 to a value of "1" to indicate that the ACPI subsystem 115 is in the critical sections. After the ACPI subsystem 115 is no longer in the critical sections, the ACPI subsystem 115 will set the In flag 125 to a value of "0".

As discussed above, when the ACPI subsystem 115 needs to access and manipulate its critical section, the ACPI subsystem 115 will first check the value of the turn flag 130 in order to determine if the system firmware 105 or the ACPI subsystem 115 has the turn to access the critical sections. If the turn flag 130 indicates that the ACPI subsystem 115 has the turn to access the critical sections (i.e., the turn flag 130 has a value of "1" in the above example), then the ACPI subsystem 115 will write tot eh turn flag 130 in order to attempt to give the turn to the other entity (system firmware 105) to access the critical sections.

After the ACPI subsystem 115 has accessed the critical sections and is no longer in the critical sections, the ACPI subsystem 115 will set the In flag 120 to a value of "0".

In the IA-64 architecture, the system firmware 105 may still be active during run time. Since the OS may not be aware that the system firmware 105 may still be active, there could be a contention of hardware resources between the OS and system firmware 105. For example, a read or write command might access a resource that the system firmware 105 is modifying or accessing.

As another example, during a machine check procedure, the system firmware 105 checks for errors, handles an error on, e.g., a PCI bus, and performs recovery if possible. At the same time, ACPI subsystem 115 may be involved in obtaining information from the same PCI bus where the error is detected by the system firmware 105. In previous approaches, "backdoor hooks" are used to permit the ACPI subsystem 115 to switch out and permit the system firmware 105 to finish its error handling and recovery. However, if ACPI subsystem 115 is active during the switch out, then the ACPI subsystem 115 may be left in an undetermined state. In the IA-64 architecture, backdoor hooks are not utilized. However, hardware is not available to permit semaphores. An embodiment of the invention permits mutual exclusion on critical sections by use of a software algorithm, as discussed above.

Figure 2:
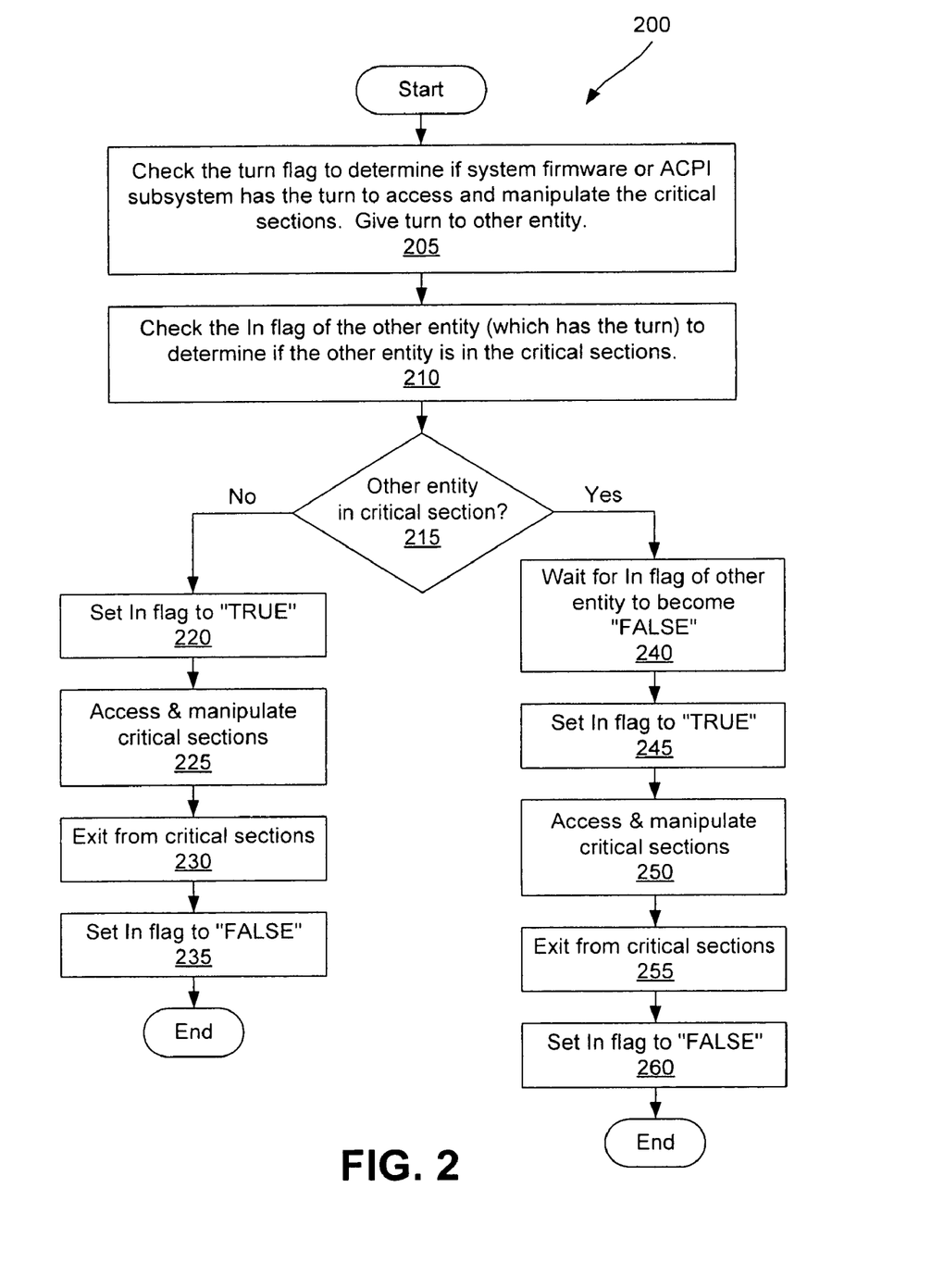
FIG. 2 is a flowchart illustrating a method for semaphoring between system firmware and the ACPI subsystem, in accordance with an embodiment of the invention.

FIG. 2 is a flowchart illustrating a method 200 for semaphoring between system firmware and the ACPI subsystem, in accordance with an embodiment of the invention. The method 200 covers the case when a first entity will be accessing the critical sections, but another entity has the turn to access and manipulate the critical sections. One entity is the system firmware, while another entity is the ACPI subsystem. As noted above, the ACPI subsystem may be any suitable hardware manipulation subsystem.

In this example, assume that the entity that will enter the critical section is the system firmware. However, the same method 200 in FIG. 2 similarly applies when the entity to enter the critical section is the ACPI subsystem. Before the system firmware enters the critical sections, the system firmware checks (205) the turn flag to determine if the system firmware or the ACPI subsystem has the turn to access and manipulate the critical sections. Assuming that Peterson's algorithm is used as part of this method, the system firmware will write to the turn flag in an attempt to give the turn to the ACPI subsystem.

Assume in FIG. 2 that the other entity (i.e., the ACPI subsystem) has the turn to access/manipulate the critical sections. The system firmware then checks (210) the In flag of the ACPI subsystem (i.e., the other entity which currently has the turn this example), in order to determine if the ACPI subsystem is currently in the critical sections.

In step 215, if the ACPI subsystem is not in the critical sections, then the method 200 proceeds to actions (220) to (235). On the other hand, if the ACPI subsystem is in the critical sections, then the method 200 proceeds to actions (240) to (260).

In step 215, if the ACPI subsystem is not in the critical sections, then the system firmware sets (220) its In flag to "TRUE" and accesses & manipulates (225) the critical sections. The system firmware then exits (230) from the critical sections and sets (235) its In flag to "FALSE" to indicate that it is no longer in the critical sections. The method 200 then ends.

In step 215, if the ACPI subsystem is currently in the critical sections, then the system firmware waits (240) for the In flag of the ACPI subsystem to become "FALSE". In an alternative embodiment, the system firmware does not wait for the ACPI subsystem to exit from the critical sections; instead the system firmware can send a failure message (or resource busy message) to the user and inform the user to retry entry into the critical section at a subsequent time. This alternative embodiment is useful due to the timing constraints in the operation of the system firmware and operating system.

After the In flag of the ACPI subsystem becomes "FALSE", then the ACPI subsystem has exited the critical sections. The system firmware then sets (245) its In flag to "TRUE" and accesses & manipulates (250) the critical sections. The system firmware then exits (255) from the critical sections and sets (260) its In flag to "FALSE" to indicate that it is no longer in the critical sections. The method 200 then ends.

Figure 3:
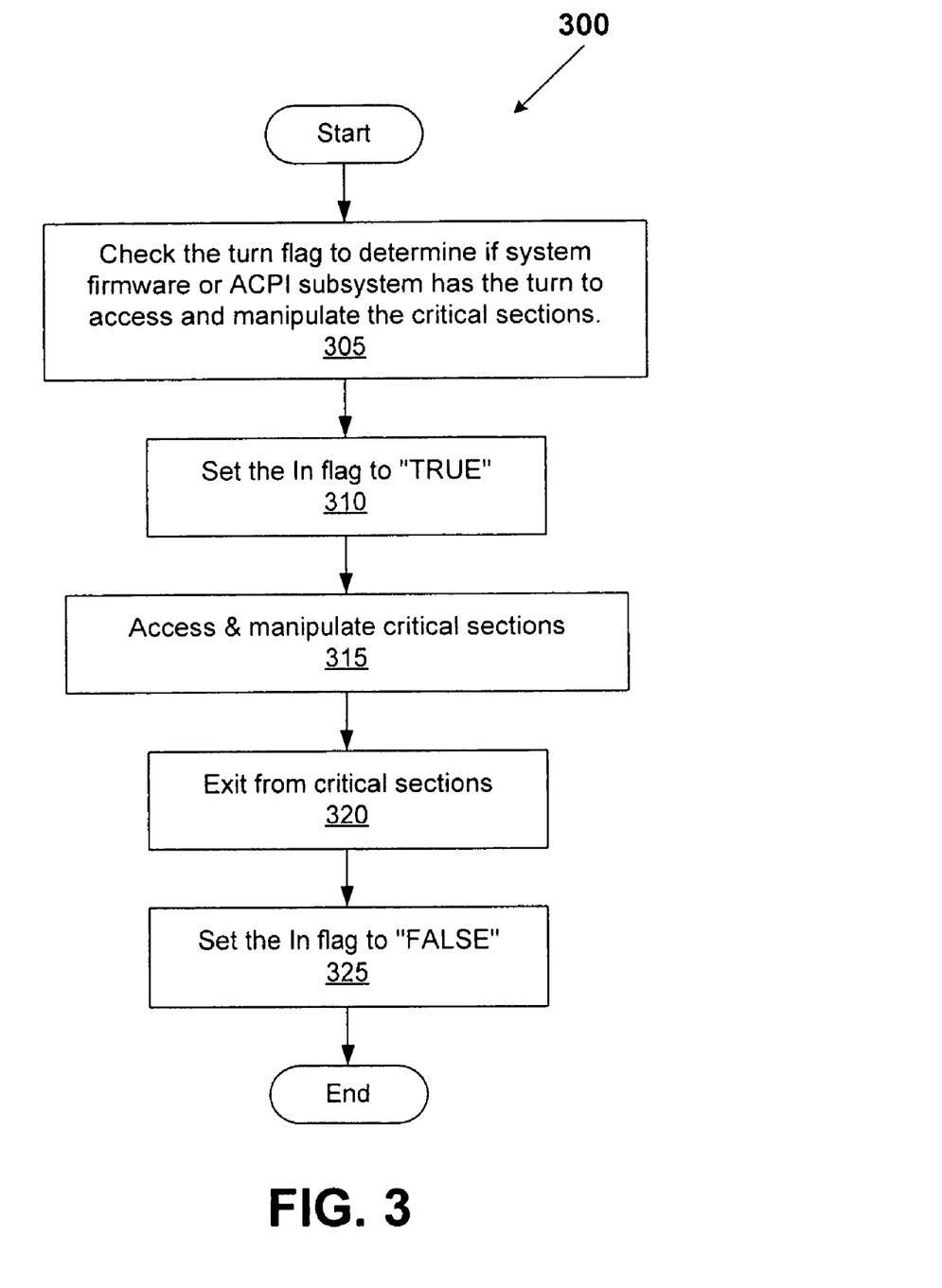
FIG. 3 is a flowchart illustrating another method for semaphoring between system firmware and the ACPI subsystem, in accordance with an embodiment of the invention.

FIG. 3 is a flowchart illustrating another method 300 for semaphoring between system firmware and the ACPI subsystem, in accordance with an embodiment of the invention. The method 300 covers the case when a first entity will be accessing the critical sections, and has the turn to access and manipulate the critical sections.

In this example, assume that the entity that will enter the critical section is the system firmware. However, the same method 300 in FIG. 3 similarly applies when the entity to enter the critical section is the ACPI subsystem. Before the system firmware enters the critical sections, the system firmware checks (305) the turn flag to determine if the system firmware or the ACPI subsystem has the turn to access and manipulate the critical sections. Assume in FIG. 3 that the system firmware (i.e., the entity entering the critical sections) has the turn to access/manipulate the critical sections. Assuming that Peterson's algorithm is used as part of this method, the system firmware will first write to the turn flag in an attempt to give the turn to the ACPI subsystem.

In step 310, assume that the ACPI subsystem has taken its turn and has finished accessing the critical sections. Therefore, in step 310, the system firmware sets (310) its In flag to "TRUE" when the ACPI subsystem is no longer in the critical sections, and accesses & manipulates (315) the critical sections. The system firmware then exits (320) from the critical sections and sets (325) its In flag to "FALSE" to indicate that it is no longer in the critical sections. The method 300 then ends.

An example of the ACPI subsystem operation in the critical sections is when the hotplug PCI enters into the critical sections to manipulate particular registers and/or chips. The critical sections may include registers that are modified by the system firmware and ACPI subsystem. Contention problems for critical sections may occur if, for example, the SAL 145 receives a request to perform firmware service and access to critical sections for the system firmware 105 will be required. An embodiment of the invention advantageously provides the semaphoring system and method, as discussed above, to solve contention problems for critical sections. Furthermore, the above-described semaphoring system and method advantageously eliminates the need for interrupt handling which was typically required in previous approaches.

The various engines or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of embodiments of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of semaphoring between a system firmware and Advanced Configuration and Power Interface (ACPI) subsystem, the method comprising:

prior to entering a critical section of a shared memory by a first entity, checking, by the first entity, a turn flag to determine if the first entity or a second entity has a turn to access the critical section of the shared memory, wherein the turn flag has a first value if the first entity has the turn to access the critical section and wherein the turn flag has a second value if the second entity has the turn to access the critical section;

if the first entity will attempt to access the critical section and if the first entity has the turn to access the critical section of the shared memory, then changing, by the first entity, a value in the turn flag from the first value to the second value so that the second entity will have the turn to access the critical section of the shared memory;

if the first entity will attempt to access the critical section and if the second entity has the turn to access the critical section of the shared memory, then checking, by the first entity, a second In flag that is associated with the second entity so that the first entity determines if the second entity is in the critical section, wherein the second In flag has the first value if the second entity is in the critical section and has the second value if the second entity is not in the critical section;

if the first entity will attempt to access the critical section and if the second entity is in the critical section, then avoiding to enter the critical section by the first entity until after the second entity exits the critical section;

changing, by the second entity, the second In flag to the second value after the second entity exits the critical section;

changing, by the first entity, a first In flag that is associated with the first entity to the first value prior to the first entity entering the critical section, wherein the first In flag has the first value if the first entity is in the critical section and has the second value if the first entity is not in the critical section; and entering the critical section by the first entity after the second entity exits the critical section and after the first entity has set the first In flag to the first value.

2. The method of claim 1, further comprising:
setting the first In flag to the first value prior to the first entity entering the critical section and wherein the second entity does not enter the critical section when the first In flag has the first value.

3. The method of claim 1, further comprising:
setting the first In flag to the second value after the first entity exits the critical section.

4. The method of claim 1, further comprising:
if the second entity is not in the critical section, then entering the critical section by the first entity.

5. The method of claim 1, wherein the first entity is the system firmware and the second entity is the ACPI subsystem.

6. The method of claim 1, wherein the first entity is the ACPI subsystem and the second entity is the system firmware.

7. The method of claim 1, wherein the first entity checks a shared memory to determine priority in the critical section.

8. An apparatus for semaphoring between a system firmware and Advanced Configuration and Power Interface (ACPI) subsystem, the apparatus comprising:

a first entity;
a second entity;
a shared memory;
a semaphoring system between the first entity and second entity, wherein prior to the first entity entering a critical section of the shared memory, wherein the first entity is configured to check a turn flag to determine if the first entity or the second entity has a turn to access the critical section of the shared memory, wherein the turn flag has a first value if the first entity has the turn to access the critical section and wherein the turn flag has a second value if the second entity has the turn to access the critical section;

wherein if the first entity will attempt to access the critical section and if the first entity has the turn to access the critical section of the shared memory, then the first entity changes a value in the turn flag from the first value to the second value so that the second entity will have the turn to access the critical section of the shared memory;

wherein if the first entity will attempt to access the critical section, then the first entity is configured to check a second In flag that is associated with the second entity so that the first entity determines if the second entity is in the critical section, if the second entity has the turn to access the critical section, wherein the second In flag has the first value if the second entity is in the critical section and has the second value if the second entity is not in the critical section;

wherein the second entity changes the second In flag to the second value after the second entity exits the critical section;

wherein the first entity changes a first In flag that is associated with the first entity to the first value prior to the first entity entering the critical section, wherein the first In flag has the first value if the first entity is in the critical section and has the second value if the first entity is not in the critical section;

wherein the first entity is configured to avoid to enter the critical section until after the second entity exits the critical section, and to enter the critical section after exit of the critical section by the second entity and after the first entity has set the first In flag to the first value.

9. The apparatus of claim 8, wherein the first entity is the system firmware and the second entity is the ACPI subsystem.

10. The apparatus of claim 8, wherein the first entity is the ACPI subsystem and the second entity is the system firmware.

11. The apparatus of claim 8, wherein the first entity checks a shared memory to determine priority in the critical section.

12. The apparatus of claim 8, wherein the first entity sets the first In flag to the first value prior to the first entity entering the critical section and wherein the second entity does not enter the critical section when the first In flag has the first value.

13. The apparatus of claim 8, wherein the first entity sets the first In flag to the second value after the first entity exits the critical section.

14. An apparatus for semaphoring between a system firmware and Advanced Configuration and Power Interface (ACPI) subsystem, the apparatus comprising:

means for checking a turn flag to determine if a first entity or a second entity has a turn to access a critical section of a shared memory, prior to entering the critical section by a first entity, wherein the turn flag has a first value if the first entity has the turn to access the critical section and wherein the turn flag has a second value if the second entity has the turn to access the critical section;

means for changing a value in the turn flag from the first value to the second value so that the second entity will have the turn to access the critical section of the shared memory if the first entity has the turn to access the critical section of the shared memory and if the first entity will attempt to access the critical section;

means for checking a second In flag that is associated with the second entity so that the first entity determines if the second entity is in the critical section of the shared memory, if the second entity has the turn to access the critical section and if the first entity will attempt to access the critical section, wherein the second In flag has the first value if the second entity is in the critical section and has the second value if the second entity is not in the critical section;

means for avoiding to enter the critical section by the first entity until after the second entity exits the critical section;

means for changing, by the second entity, the second In flag to the second value after the second entity exits the critical section;

means for changing, by the first entity, a first In flag that is associated with the first entity to the first value prior to the first entity entering the critical section, wherein the first In flag has the first value if the first entity is in the critical section and has the second value if the first entity is not in the critical section; and means for entering the critical section by the first entity after the second entity exits the critical section and after the first entity has set the first In flag to the first value.

15. The apparatus of claim 14, wherein the first entity sets the first In flag to the first value prior to entering the critical section and wherein the second entity does not enter the critical section when the first In flag has the first value.

16. The apparatus of claim 14, wherein the first entity sets the first In flag to the second value after the first entity exits the critical section.

17. An article of manufacture, comprising:

a machine-readable storage medium having stored thereon instructions to permit a computer to perform a method comprising:

prior to entering a critical section by a first entity, checking a turn flag to determine if the first entity or a second entity has a turn to access the critical section of the shared memory, wherein the turn flag has a first value if the first entity has the turn to access the critical section and wherein the turn flag has a second value if the second entity has the turn to access the critical section;

if the first entity will attempt to access the critical section and if the first entity has the turn to access the critical section of the shared memory, then changing, by the first entity, a value in the turn flag from the first value to the second value so that the second entity will have the turn to access the critical section of the shared memory;

if the first entity will attempt to access the critical section and if the second entity has the turn to access the critical section of the shared memory, then checking a second In flag that is associated with the second entity so that the first entity determines if the second entity is in the critical section, wherein the second In flag has the first value if the second entity is in the critical section and has the second value if the second entity is not in the critical section;

if the first entity will attempt to access the critical section and if the second entity is in the critical section, then avoiding to enter the critical section by the first entity until after the second entity exits the critical section;

changing, by the second entity, the second In flag to the second value after the second entity exits the critical section;

changing, by the first entity, a first In flag that is associated with the first entity to the first value prior to the first entity entering the critical section, wherein the first In flag has the first value if the first entity is in the critical section and has the second value if the first entity is not in the critical section; and entering the critical section by the first entity after the second entity exits the critical section and after the first entity has set the first In flag to the first value.

18. The article of manufacture of claim 17, wherein the first entity sets the first In flag to the first value prior to the first entity entering the critical section and wherein the second entity does not enter the critical section when the first In flag has the first value.

19. The article of manufacture of claim 17, wherein the first entity sets the In flag to the second value after the first entity exits the critical section.

* * * * *